United States Patent
Ishihara et al.

(10) Patent No.: US 12,183,373 B2
(45) Date of Patent: Dec. 31, 2024

(54) MAGNETIC DISK DEVICE, CONTROL METHOD, AND COMPUTER PROGRAM PRODUCT

(71) Applicant: KABUSHIKI KAISHA TOSHIBA, Tokyo (JP)

(72) Inventors: Yoshiyuki Ishihara, Kawasaki Kanagawa (JP); Shinji Takakura, Yokohama Kanagawa (JP); Makihiko Ishitani, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 18/456,496

(22) Filed: Aug. 27, 2023

(65) Prior Publication Data

US 2024/0257832 A1    Aug. 1, 2024

(30) Foreign Application Priority Data

Jan. 30, 2023    (JP) ................................ 2023-012155

(51) Int. Cl.
G11B 5/48      (2006.01)
G11B 5/56      (2006.01)

(52) U.S. Cl.
CPC .............. G11B 5/4833 (2013.01); G11B 5/56 (2013.01)

(58) Field of Classification Search
None
See application file for complete search history.

(56) References Cited

U.S. PATENT DOCUMENTS

| | | | |
|---|---|---|---|
| 6,614,615 B1* | 9/2003 | Ju | G11B 5/59622 360/78.04 |
| 7,145,745 B1* | 12/2006 | Shepherd | G11B 5/5552 |
| 7,283,321 B1* | 10/2007 | Sun | G11B 5/5552 |
| 7,626,782 B1 | 12/2009 | Yu et al. | |
| 8,611,040 B1* | 12/2013 | Xi | G11B 5/59627 360/78.05 |

(Continued)

OTHER PUBLICATIONS

Jun Ishikawa et al., "A Robust Stability Analysis on Learning Control for Hard Disk Drives," Adv. Info. Storage Syst., vol. 10, pp. 49-61 (1999).

(Continued)

*Primary Examiner* — William J Klimowicz
(74) *Attorney, Agent, or Firm* — Finnegan, Henderson, Farabow, Garrett & Dunner, LLP

(57) ABSTRACT

According to an embodiment, a magnetic disk device includes: a magnetic disk; an arm; a support member provided at a distal end of the arm; a magnetic head provided on the support member and configured to access the magnetic disk; a first actuator configured to rotate the arm; a second actuator configured to drive the support member; and one or more processors configured to implement a controller configured to perform seek control of the magnetic head. The controller includes: a feedback controller configured to control a first command value for driving the first actuator so as to reduce an error between a position of the magnetic head and a target position; and an iterative learning controller configured to receive an input value based on the error and output a second command value for driving the second actuator by iterative learning.

6 Claims, 10 Drawing Sheets

(56) References Cited

U.S. PATENT DOCUMENTS

| | | | | |
|---|---|---|---|---|
| 8,767,343 B1* | 7/2014 | Helmick | ............... | G11B 5/5547 |
| | | | | 369/30.16 |
| 8,902,535 B1* | 12/2014 | Nie | ...................... | G11B 5/5547 |
| | | | | 360/75 |
| 9,142,234 B1* | 9/2015 | Lou | ...................... | G11B 5/5547 |
| 9,953,672 B1* | 4/2018 | Szita | ................... | G11B 5/5547 |
| 10,593,354 B1* | 3/2020 | Ng | ............................ | G11B 5/02 |
| 11,023,827 B2* | 6/2021 | Tsuneki | ................ | G06N 20/00 |
| 11,514,937 B1* | 11/2022 | Matsuzawa | .......... | G11B 5/4873 |
| 2002/0041472 A1* | 4/2002 | Ding | .................... | G11B 5/5582 |
| | | | | 360/290 |
| 2006/0098329 A1* | 5/2006 | Nguyen | ................. | G11B 5/596 |
| | | | | 360/77.02 |
| 2007/0076314 A1* | 4/2007 | Rigney | ............... | G11B 5/59688 |
| | | | | 360/75 |
| 2012/0194943 A1* | 8/2012 | Hironaka | ........... | G11B 5/59627 |
| | | | | 360/75 |
| 2023/0195844 A1* | 6/2023 | Ishitani | ................... | G06F 17/15 |
| | | | | 706/45 |
| 2023/0307001 A1* | 9/2023 | Iwashiro | ................ | G11B 21/08 |

OTHER PUBLICATIONS

Masahito Kobayashi et al., "Track Seek Control for Hard Disk Dual-Stage Servo Systems," IEEE Trans. on Magnetics, vol. 37, No. 2, pp. 949-954 (2001).

* cited by examiner

MAGNETIC DISK DEVICE, CONTROL METHOD, AND COMPUTER PROGRAM PRODUCT

CROSS-REFERENCE TO RELATED APPLICATIONS

This application is based upon and claims the benefit of priority from Japanese Patent Application No. 2023-012155, filed on Jan. 30, 2023; the entire contents of which are incorporated herein by reference.

FIELD

An Embodiment described herein relates generally to a magnetic disk device, a control method, and a computer program product.

BACKGROUND

In the magnetic disk device, for example, dual-stage actuators of a voice coil motor (VCM) and a microactuator (MA) perform control (seek control) of positioning a magnetic head that reads and writes data on a target track. In order to improve the performance of the sequential read/write (R/W), it is necessary to increase the speed of the adjacent track seek in which the magnetic head is moved track by track. Furthermore, in order to cope with a narrower track pitch in recent years, it is also required to increase the accuracy of positioning at the time of the seek settling.

For speeding up, a method using an advanced operation of MA has been proposed. For settling improvement, a method using iterative learning control has been proposed. In seek control using conventional iterative learning control, it is common to update the control input and the target trajectory for each seek of the VCM.

DETAILED DESCRIPTION

Figure 1:
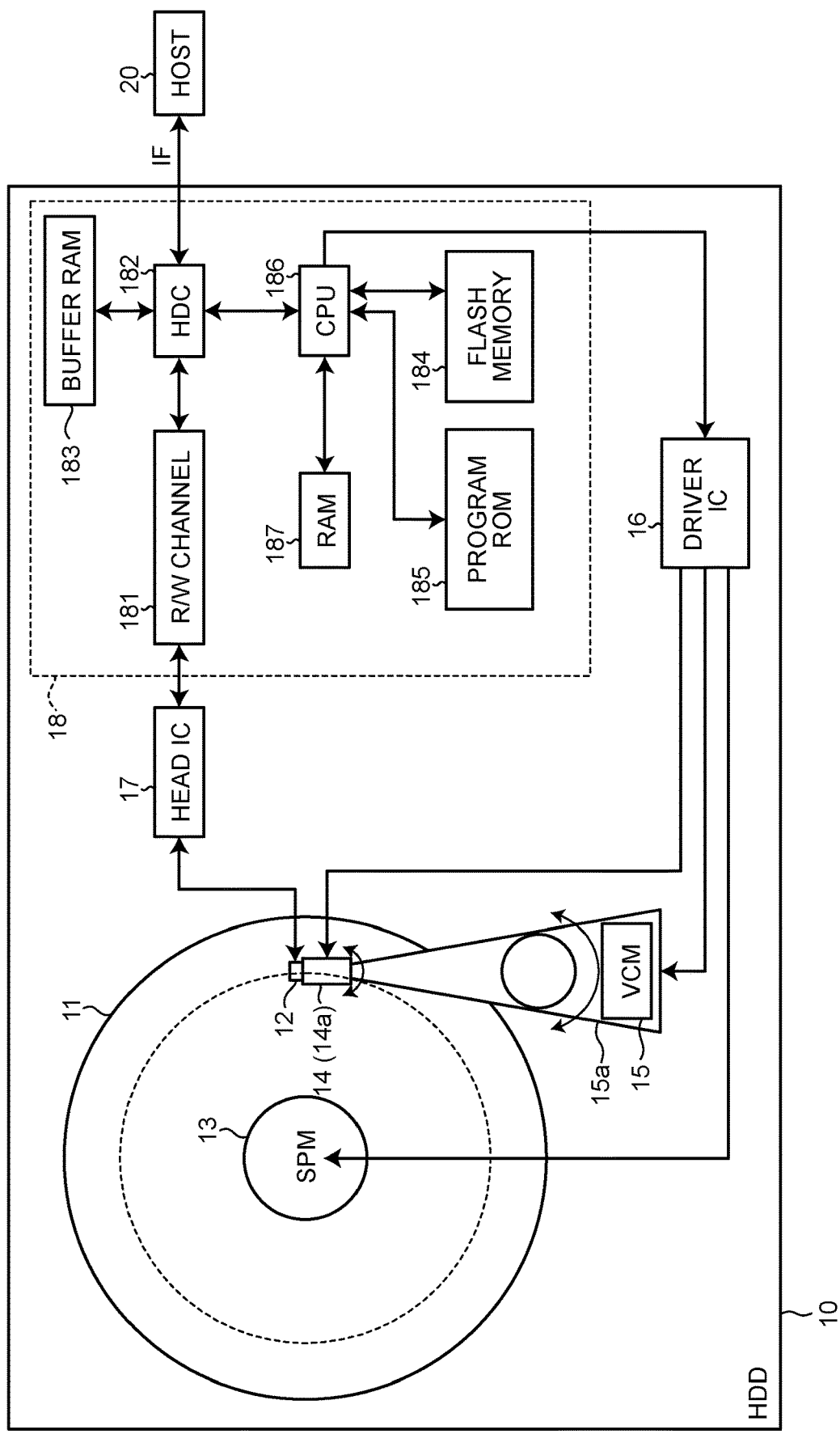
FIG. 1 is a block diagram of a magnetic disk device according to an embodiment.

According to an embodiment, a magnetic disk device includes a magnetic disk, an arm, a support member, a magnetic head, a first actuator, a second actuator, and one or more processors. The support member is provided at a distal end of the arm. The magnetic head is provided on the support member and configured to access the magnetic disk. The first actuator is configured to rotate the arm. The second actuator is configured to drive the support member. The one or more processors is configured to implement a controller configured to perform seek control of the magnetic head. The controller includes a feedback controller and an iterative learning controller. The feedback controller is configured to control a first command value for driving the first actuator so as to reduce an error between a position of the magnetic head and a target position. The iterative learning controller is configured to receive an input value based on the error and output a second command value for driving the second actuator by iterative learning.

Hereinafter, a preferred embodiment of a magnetic disk device according to the present invention will be described in detail with reference to the accompanying drawings.

The present embodiment provides a high-speed and highly accurate adjacent track seek control method in a magnetic disk device including two or more stages of actuators for positioning a head. For example, in the present embodiment, in the adjacent track seek, the iterative learning control is applied to the control input related to the advanced operation of the MA. As a result, a control method that achieves both high speed and high accuracy of settling is realized.

The dual-stage actuator has a configuration including an actuator Aa (first actuator, first-stage actuator) that moves the head relatively large and an actuator Ab (second actuator, second stage actuator) that moves the head relatively small. The actuator Aa is, for example, an actuator (VCM or the like) that drives an arm having a head disposed at a distal end. The actuator Ab is, for example, an actuator (MA or the like) that is provided at the distal end of the arm and drives a support member (for example, a slider or a suspension) that supports the head. The actuator Ab corresponds to the distal end side actuator of the dual-stage actuator.

The triple-stage actuator has a configuration including the actuator Aa and two actuators Ab (second-stage and third-stage actuators) that move the head relatively small. The actuators Ab are, for example, two actuators that drive two respective support members that support the magnetic head. The two support members are, for example, a suspension connected to the arm and a slider connected to the suspension.

Hereinafter, a case where the actuator has two stages will be described as an example, but a similar method can be applied to a case where the actuator has three or more stages. For example, one of the plurality of actuators Ab included in the triple-stage or more actuator can be controlled in the same manner as the actuator Ab in the dual-stage actuator.

FIG. 1 is a block diagram illustrating a configuration of a main part of a hard disk drive (HDD) 10 as a magnetic disk device of the present embodiment.

A host 20 is a device that uses the HDD 10 as a storage device. The host 20 is connected to the HDD 10 by a host interface IF.

The HDD 10 includes one or more disks 11 (magnetic disks), a plurality of magnetic heads 12, a spindle motor (SPM) 13, a microactuator (MA) 14, a support member 14a, a voice coil motor (VCM) 15, an arm 15a, a driver integrated circuit (IC) 16, a head IC 17, and a system large scale integration (LSI) 18.

The disk 11 is a magnetic recording medium, and is disposed to be stacked at regular intervals. The disk 11 includes an upper disk face and a lower disk face. In the present embodiment, both surfaces (upper disk face, lower disk face) of the disk 11 are recording faces on which data is magnetically recorded. The disk 11 is rotated at a high speed by the SPM 13. The HDD 10 may include one disk 11 or a plurality of (for example, 10 or more) disks 11.

The magnetic head 12 is disposed corresponding to each of recording faces (upper disk face, lower disk face) on both sides of each disk 11, and is used for writing data to the recording face of the disk 11 and reading data written on the recording face. The magnetic head 12 is attached to the distal end of the support member 14a.

The SPM 13 is driven by a drive current (or a drive voltage) supplied from the driver IC 16.

The support member 14a is a member that supports the magnetic head 12, and is provided at the distal end of the arm 15a. The support member 14a is, for example, a slider or a suspension.

The MA 14 is attached to the base or the distal end portion of the support member 14a and drives the support member 14a. The MA 14 is, for example, a piezoelectric element. The MA 14 corresponds to an actuator configured to drive the distal end side in the dual-stage actuator. The MA 14 can be driven at a higher speed and with higher accuracy than the VCM 15. Therefore, seek control can be speeded up by operating the MA 14 in advance prior to the VCM 15.

The VCM 15 rotates the arm 15a. The VCM 15 corresponds to the actuator Aa that moves the head relatively large. On the other hand, the MA 14 corresponds to the actuator Ab that minutely (relatively small) moves the support member 14a provided at the distal end of the arm 15a.

The VCM 15 and the MA 14 are driven by a command value supplied from the driver IC 16. As a result, the magnetic head 12 moves in the radial direction of the disk 11. The command value is, for example, a drive current or a drive voltage.

The driver IC 16 drives the SPM 13, the MA 14, and the VCM 15 under the control of a central processing unit (CPU) 186 described later in the system LSI 18.

The head IC 17 amplifies a signal (readout signal) read by the magnetic head 12. In addition, the head IC 17 converts write data transferred from an R/W (read/write) channel 181 to be described later in the system LSI 18 into a write current to output the write current to the magnetic head 12.

The system LSI 18 is an LSI called a system on a chip (SoC) in which a plurality of elements is integrated on one chip. The system LSI 18 includes an R/W channel 181, a hard disk controller (HDC) 182, a buffer random access memory (RAM) 183, a flash memory 184, a program read only memory (ROM) 185, a CPU 186, and a RAM 187.

The R/W channel 181 is a signal processing device that processes a signal group related to reading and writing. The R/W channel 181 digitizes the readout signal and decodes the readout data from the digitized data. In addition, the R/W channel 181 acquires servo data necessary for positioning the magnetic head 12 from digital data. In addition, the R/W channel 181 encodes write data.

The HDC 182 is connected to the host 20 via the host interface IF. The HDC 182 receives a command (write command, read command, and the like) transferred from the host 20. The HDC 182 controls data transfer between the host 20 and the HDC 182. In addition, the HDC 182 controls data transfer between the disk 11 and the HDC 182.

The buffer RAM 183 constitutes a buffer area for temporarily storing data to be written to the disk 11 via the head IC 17 and the R/W channel 181 and data read from the disk 11.

The flash memory 184 is a rewritable nonvolatile memory.

The program ROM 185 stores a control program (firmware). Note that the control program may be stored in a partial area of the flash memory 184. The control program is a program used after shipment.

The CPU 186 functions as a main controller of the HDD 10. The CPU 186 controls at least some elements in the HDD 10 according to a control program or an adjustment program stored in the program ROM 185.

At least a partial area of the RAM 187 is used as a work area of the CPU 186.

The HDD 10 configured as described above includes a feedback control system that executes seek control of the magnetic head 12. The feedback control system is executed by, for example, the CPU 186 at regular time intervals, that is, every time servo data is acquired. Hereinafter, this constant time interval is referred to as a sample time.

Figure 2:
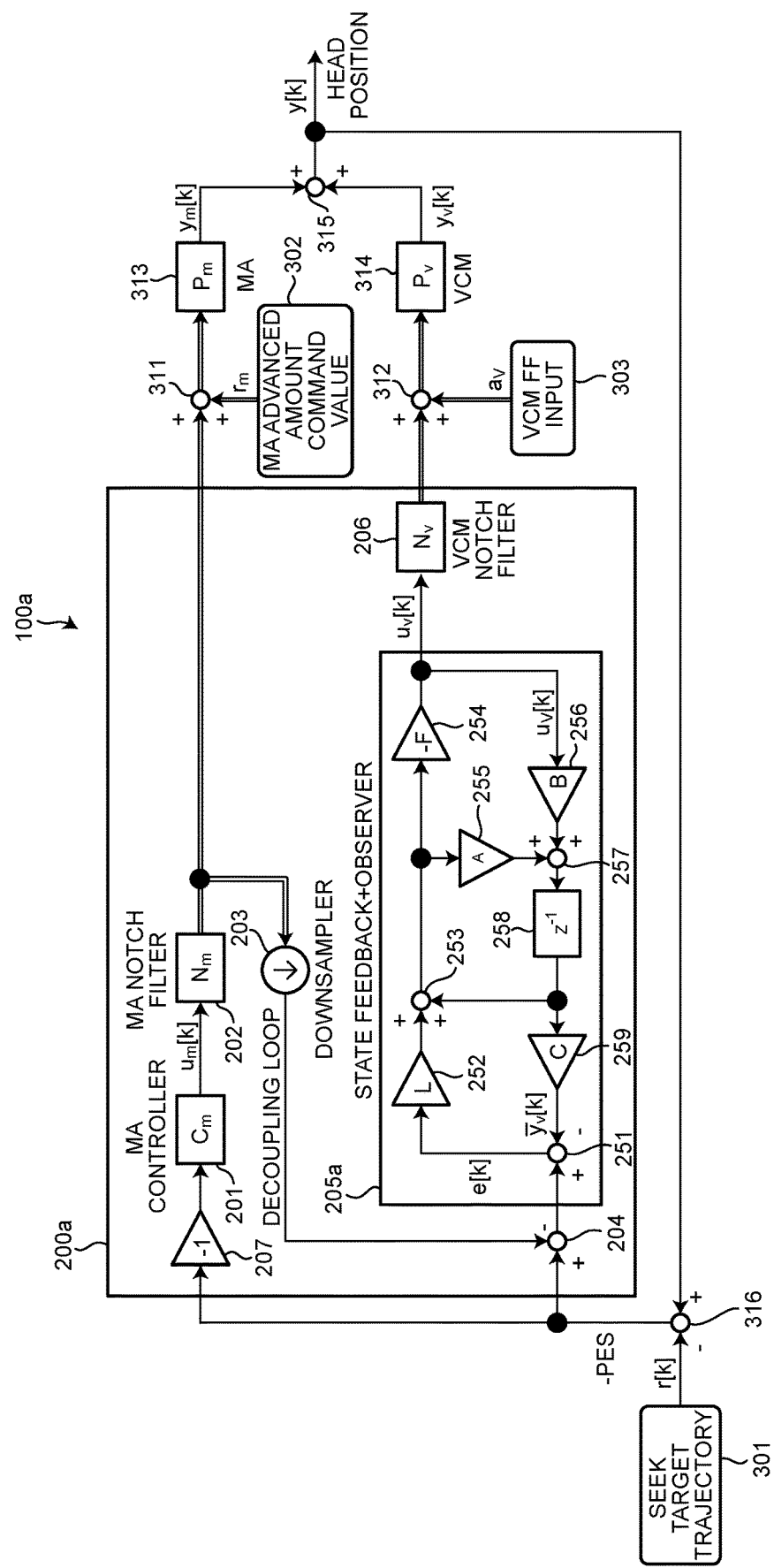
FIG. 2 is a block diagram of a seek control unit.

FIG. 2 is a block diagram illustrating a configuration example of a seek control unit 100a (an example of a control unit) that can be used for seek control of the magnetic head 12. The seek control unit 100a includes a feedback control system 200a, arithmetic units 311, 312, and 315, transmission characteristics 313 and 314, and an error detector 316.

The feedback control system 200a corresponds to a feedback control unit configured to control a command value (first command value) for driving the VCM 15 so as to reduce (for example, set to 0) an error (a positional error signal PES to be described later) between the actual position of the magnetic head 12 and the target position of the magnetic head 12. The feedback control system 200a includes an MA controller 201, an MA notch filter 202, a downsampler 203, an arithmetic unit 204, a state feedback+observer 205a, a VCM notch filter 206, and a gain arithmetic unit 207.

The MA controller 201 calculates a control input $u_m\{k\}$ of the MA 14. Note that k represents identification information for identifying the sample time. For example, $u_m\{k\}$ represents the control input of the MA 14 at the k-th sample time. Hereinafter, the notation of {k} representing the sample time may be omitted.

The MA notch filter 202 is a filter that removes the mechanical resonance frequency component of the MA 14 from the control input $u_m$. The MA notch filter 202 is used to enhance the stability of the feedback loop.

Note that the sampling rate of the output signal of the MA notch filter 202 does not need to be the same as the input control input $u_m$. For example, the MA notch filter 202 outputs the output signal at a sampling rate (hereinafter, referred to as an SRa) higher than the sampling rate (hereinafter, referred to as an SRb) of the control input $u_m$. For example, the SRb is twice the sampling rate SRa. Note that, in FIG. 2 and the subsequent drawings, a portion of the sampling rate SRa is represented by a single arrow, and a portion of the sampling rate SRb is represented by a double arrow.

The downsampler 203 down-samples the sampling rate of the output signal of the MA notch filter 202 from the SRb to the SRa.

The arithmetic unit 204 calculates a difference between a positional error signal (PES) that is an output of the error detector 316 and an output signal of the downsampler 203. The difference output from the arithmetic unit 204 corresponds to a subtraction value obtained by subtracting a value corresponding to the amount of movement of the MA 14 (output signal of the downsampler 203) from the positional error signal PES.

The error detector 316 detects a positional error signal (PES) indicating a difference between the target position r{k} at the k-th sample time of the magnetic head 12 and a head position signal y{k} indicating the actual position (hereinafter, head position) of the magnetic head 12, and inputs the positional error signal to the feedback control system 200a. The head position signal y corresponds to an observation signal. The target position r{k} is obtained as a target position at the k-th sample time based on a seek target trajectory 301 of the magnetic head 12.

The calculation by the arithmetic unit 204 corresponds to a calculation for obtaining a signal obtained by subtracting a signal corresponding to a displacement $y_m$ of the MA 14 from the PES by the decoupling loop. The arithmetic unit 204 inputs an arithmetic result to the state feedback+observer 205a.

The state feedback+observer 205a estimates the position, speed, disturbance input, and the like of the magnetic head 12 as a state, and multiplies the estimated state by a state feedback gain (gain "−F" multiplied by a gain arithmetic unit 254 to be described later) to calculate a control input $u_v$ of the VCM 15. The state feedback+observer 205a includes arithmetic units 251, 253, and 257, gain arithmetic units 252, 254, 255, 256, and 259, and a delay unit 258. Note that the configuration of the state feedback+observer 205a illustrated in FIG. 2 is an example, and the present invention is not limited thereto.

The arithmetic unit 251 calculates a difference e between the output of the arithmetic unit 204 and the output of the gain arithmetic unit 259. The difference e corresponds to an estimation error of the position by the state feedback+observer 205a. The gain arithmetic unit 252 multiplies the output of the arithmetic unit 251 by a gain L. The arithmetic unit 253 calculates the addition of the output of the gain arithmetic unit 252 and the output of the delay unit 258. The gain arithmetic unit 254 multiplies the output of the arithmetic unit 253 by the gain "−F" to output the multiplication result as the control input $u_v$. The gain arithmetic unit 255 multiplies the output of the arithmetic unit 253 by a gain "A". The gain arithmetic unit 256 multiplies the control input $u_v$ by a gain "B". The arithmetic unit 257 calculates the addition of the output of the gain arithmetic unit 256 and the output of the gain arithmetic unit 255. The delay unit 258 delays the output of the arithmetic unit 257 by one sample time. The gain arithmetic unit 259 multiplies the output of the delay unit 258 by a gain "C". The output value of the gain arithmetic unit 259 corresponds to an estimated value of the position by the state feedback+observer 205a (in FIG. 2, a value in which a bar is attached above $y_v\{k\}$).

The VCM notch filter 206 removes a mechanical resonance frequency component of the VCM 15 from the control input $u_v$ calculated by the state feedback+observer 205a. The VCM notch filter 206 is used to enhance the stability of the feedback loop.

The gain arithmetic unit 207 multiplies the PES output from the error detector 316 by the gain "−1" to output a multiplication result to the MA controller 201.

The arithmetic unit 311 calculates the addition of the output signal of the MA notch filter 202 and an input MA advanced amount command value 302 to input the arithmetic result to the transmission characteristic 313. The arithmetic unit 312 calculates the addition of the output signal of the VCM notch filter 206 and an input VCM FF (feedforward) input 303 to input the arithmetic result to the transmission characteristic 314.

The MA advanced amount command value 302 represents a predetermined command value for moving the MA 14 in advance prior to driving of the VCM 15 (advanced operation). The VCM FF input 303 represents an input for feedforward control of the VCM 15. The VCM FF input 303 is represented, for example, in the dimension of acceleration.

The transmission characteristic 313 represents a transmission characteristic Pm of the MA 14. The transmission characteristic 313 represents how a given control input is dynamically reflected in a displacement $y_m$ of the MA 14. The transmission characteristic 314 represents a transmission characteristic Pv of the VCM 15. The transmission characteristics 314 represent how a given control input is dynamically reflected in a displacement $y_v$ of the VCM 15. The observation signal of the feedback control system 200a is the head position signal y, which is the sum of the displacement $y_m$ of the MA 14 and the displacement $y_v$ of the VCM 15. The arithmetic unit 315 expresses, for convenience, the sum (addition value) of the displacement $y_m$ of the MA 14 and the displacement $y_v$ of the VCM 15, which corresponds to the head position signal y.

As described above, the seek target trajectory 301 corresponding to the target trajectory r of the magnetic head 12 is input to the feedback control system 200a, and the VCM FF input 303 is input to the VCM 15. Further, the MA advanced amount command value 302 is input to the MA 14. The seek target trajectory 301, the MA advanced amount command value 302, and the VCM FF input 303 are stored in advance in the flash memory 184 as time series data, for example. In addition, the time series data are read from the flash memory 184 after the HDD 10 is activated and developed in the RAM 187, and are read from the RAM 187 and used every time seek control is executed. Each time series data may be determined, for example, for each distance moved by seek control (for example, a distance between tracks before and after movement).

Figure 3:
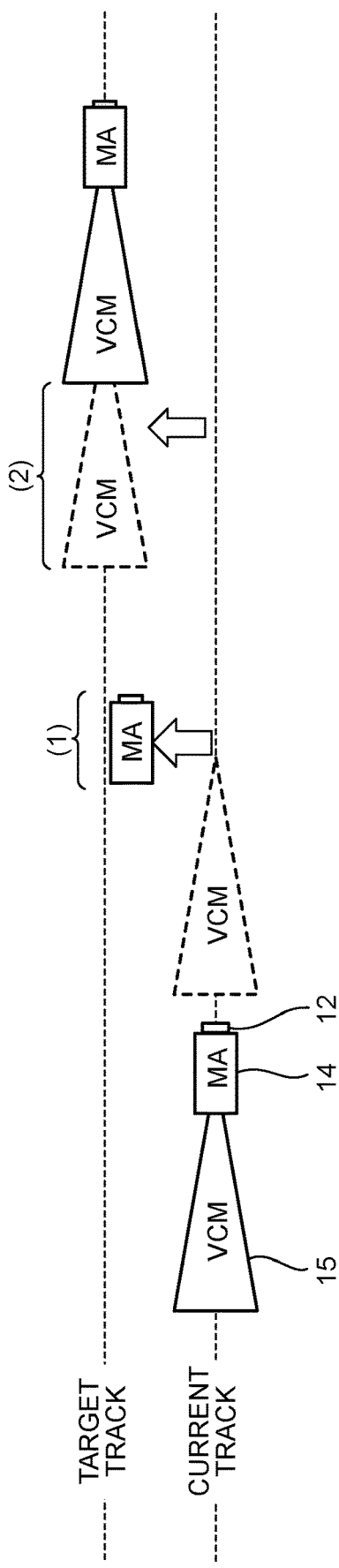
FIG. 3 is a schematic diagram illustrating a relationship between an operation during seek control and a seek target trajectory.

Next, an example of seek control of the magnetic head 12 including an advanced operation of the MA will be described. FIG. 3 is a schematic diagram illustrating a relationship between operations of the VCM 15 and the MA 14 during seek control and a seek target trajectory.

For example, in a case where the configuration example of the feedback control system 200a illustrated in FIG. 2 is used, the MA advanced amount command value 302 is given to the MA 14 that can be driven at a higher speed and with higher accuracy than the VCM 15, and seek control is executed so that the MA 14 moves toward the target track in advance prior to the movement of the VCM 15 ((1) in FIG. 3). As a result, the magnetic head 12 can be moved from the current track to the target track at a higher speed.

The VCM 15 is given the VCM FF input 303 and moved to the target track to follow the MA 14 ((2) in FIG. 3). The movement of the magnetic head 12 to the target track is completed before the VCM 15 finishes moving to the target track. Therefore, data can be read and written by the magnetic head 12 fast, compared with the case where seek control is performed only by the VCM 15. The trajectory of the head position is the sum of the trajectory of the MA 14 according to (1) and the trajectory of the VCM 15 according to (2).

Figure 4:
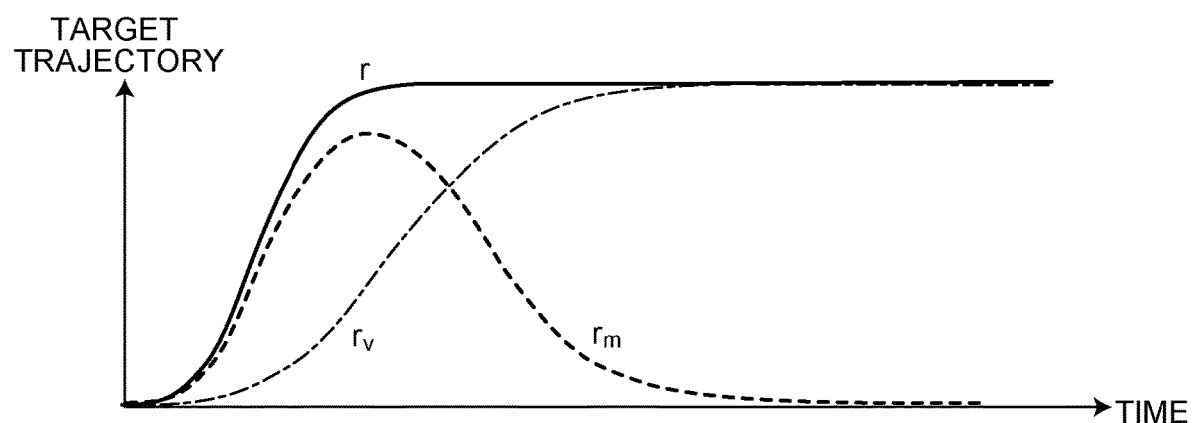
FIG. 4 is a diagram illustrating an example of a temporal change in each signal in seek control.

FIG. 4 is a diagram illustrating an example of a temporal change in each signal in the seek control described above. $r_v$ represents a target trajectory of the position of the VCM 15. $r_m$ represents the MA advanced amount command value 302 of the MA 14. r represents a target trajectory of the head position, which is the sum of the target trajectory $r_v$ and the MA advanced amount command value $r_m$.

The target trajectory r of the head position is obtained from the target seek time of the adjacent track seek (time for determining how many sample times are required to move to the adjacent track). In addition, the target trajectory $r_v$ of the position of the VCM 15 is obtained by second-order integration of the VCM FF input 303 represented by the dimension of acceleration, for example. Therefore, in general, the MA advanced amount command value $r_m$ is obtained by the following Expression (1).

$$r_m = r - r_v \quad (1)$$

However, when the target trajectory r calculated by Expression (1) is used, for example, the actual head position (head position signal y{k}) does not follow the target trajectory r due to the following factors, and the seek settling may be deteriorated.

Vibration due to mechanical resonance of the VCM 15 and the MA 14

Delay in calculation time when the feedback control system 200a is calculated by the CPU 186

Phase lag of current/voltage amplifier of driver IC 16

Figure 5:
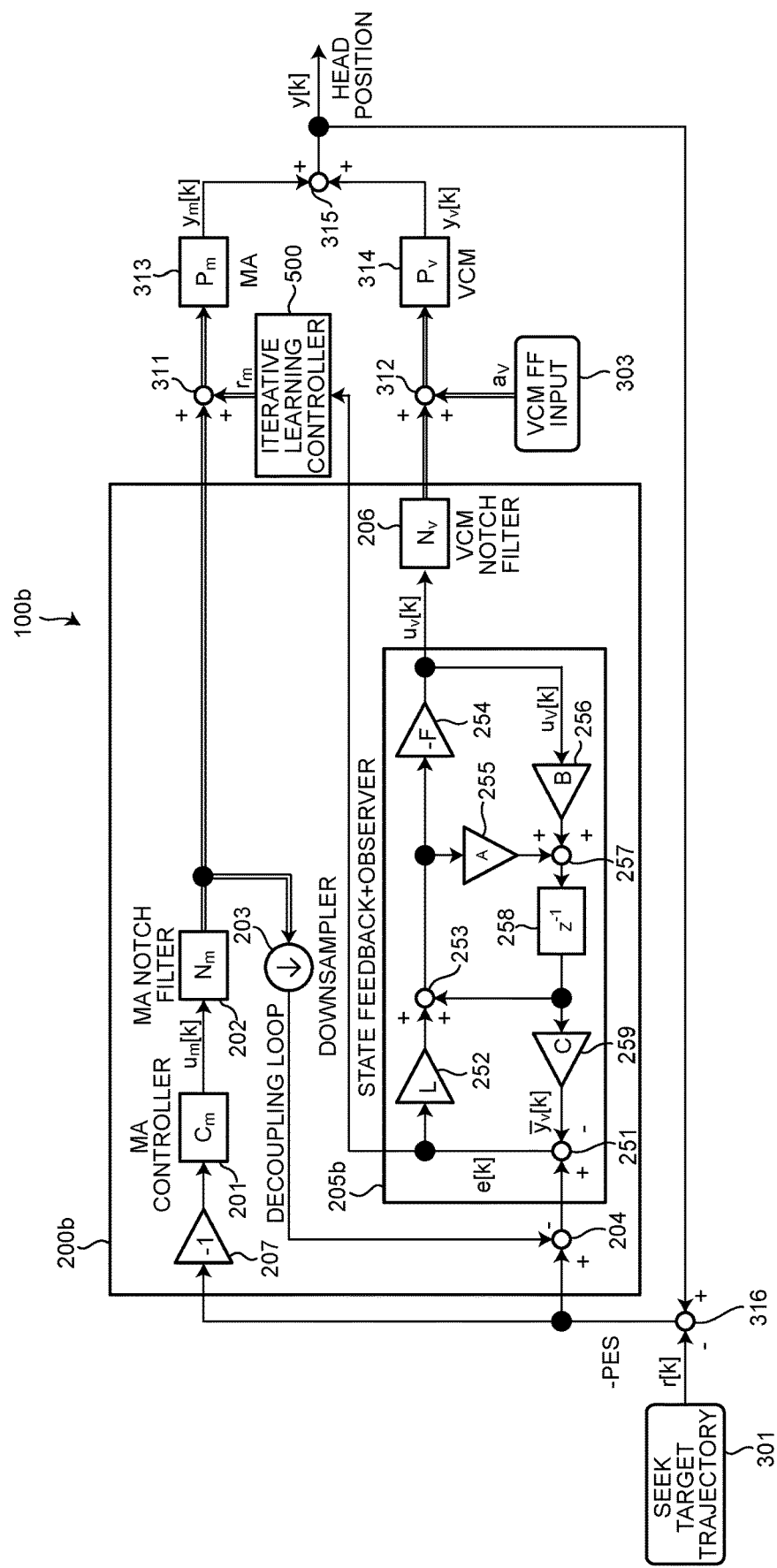
FIG. 5 is a block diagram of a seek control unit according to the embodiment.

Therefore, in the present embodiment, the MA advanced amount command value $r_m$ is generated by the iterative learning controller instead of calculating the MA advanced amount command value $r_m$ by Expression (1). FIG. 5 is a block diagram illustrating a configuration example of a seek control unit 100b (an example of a control unit) according to the present embodiment. The seek control unit 100b includes a feedback control system 200b, arithmetic units 311, 312, and 315, transmission characteristics 313 and 314, an error detector 316, and an iterative learning controller 500.

The seek control unit 100b is different from the feedback control system 200a in FIG. 2 in that the configuration of a state feedback+observer 205b in the feedback control system 200b and the addition of the iterative learning controller 500 are added. Components common to the feedback control system 200a are denoted by the same reference numerals, and description thereof is omitted.

The state feedback+observer 205b is different from the state feedback+observer 205a in that the difference e, which is an output of the arithmetic unit 251, is output to the iterative learning controller 500.

The iterative learning controller 500 generates the MA advanced amount command value $r_m$ by the iterative learning control. The iterative learning controller 500 updates the MA advanced amount command value $r_m$ using an input value that is an estimation error (difference e) of the position in the state feedback+observer 205b every time seek control is executed. When the seek control is iterated, the MA advanced amount command value $r_m$ is corrected (updated) little by little such that the difference e approaches 0 (e≈0), that is, the estimated value of the position by the observer (state feedback+observer 205a) is a state in which the actual head position (head position signal y{k}) can be accurately estimated.

The iterative learning controller 500 corresponds to an iterative learning control unit configured to receive an input value (difference e) based on an error (positional error signal PES) between the position of the magnetic head and the target position to output the MA advanced amount command value $r_m$ that is a command value (second command value) for driving the MA 14 by iterative learning.

Figure 6:
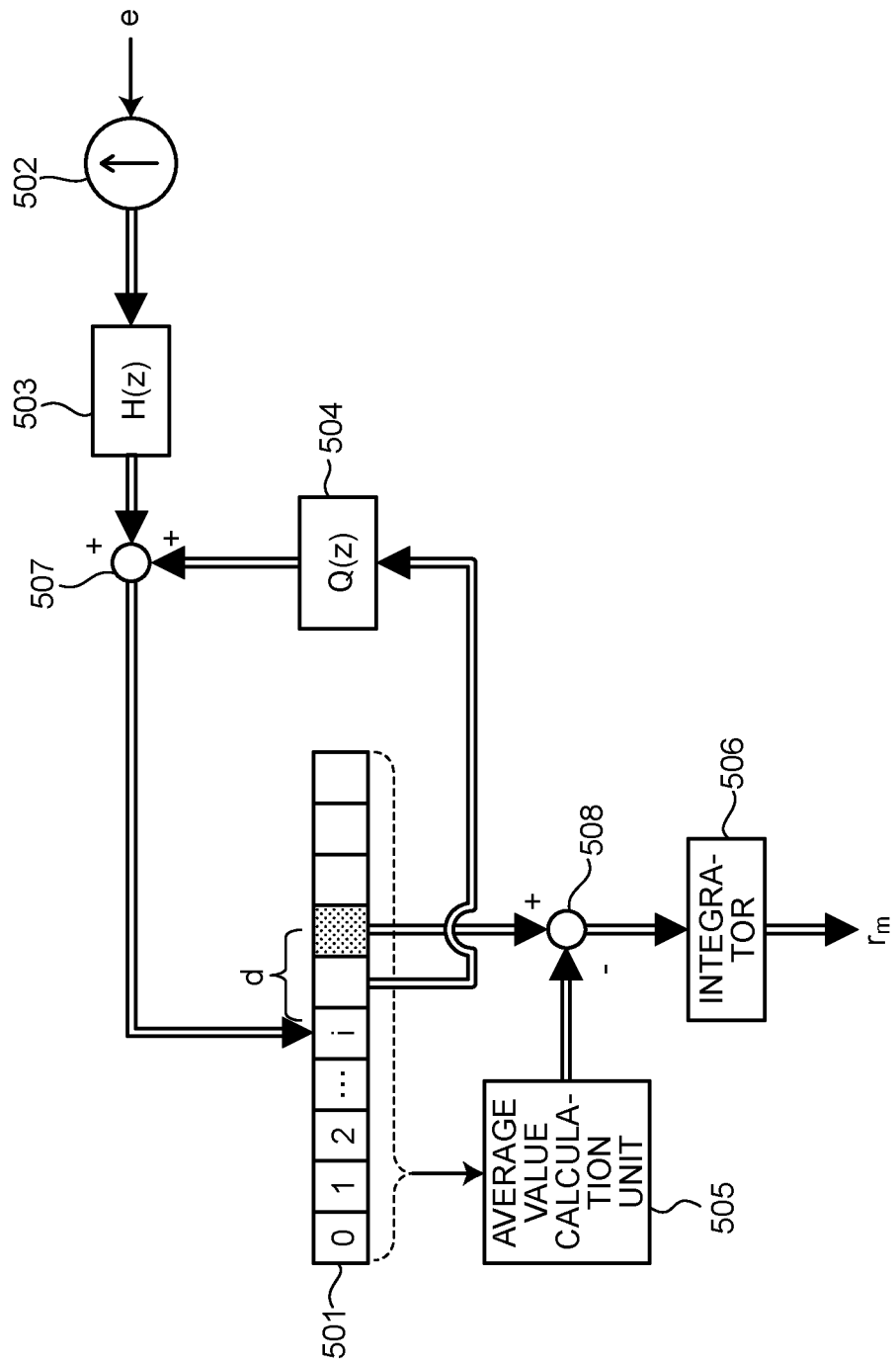
FIG. 6 is a diagram illustrating an internal structure of an iterative learning controller.

FIG. 6 is a diagram illustrating an example of an internal structure of the iterative learning controller 500. The iterative learning controller 500 includes a memory 501, an upsampler 502, a learning filter 503, a low-pass filter 504, an average value calculation unit 505, an integrator 506, an adder 507, and an adder/subtractor 508. The memory 501 is realized by, for example, the RAM 187 in FIG. 1. Each component other than the memory 501 is executed by, for example, the CPU 186 as in the feedback control system 200b.

The memory 501 stores a plurality of pieces of learning data calculated by the j-th seek control (j is an integer of 1 or more) in time series. The numerical values 0, 1, 2, . . . , i, . . . illustrated in the memory 501 of FIG. 6 correspond to the index i indicating the order of storing the learning data. For example, the learning data obtained at each sample time of the j-th seek control (sample time when upsampled by the upsampler 502) is sequentially stored at positions indicated by the indexes 0, 1, 2, . . . i, . . . of the memory 501. In each sample time of the next (j+1)-th seek control, the learning data is stored again in order from the index 0.

The upsampler 502 upsamples the input difference e. For example, the upsampler 502 upsamples the sampling rate of the difference e from the SRa to the SRb. The sample value at the sample time added in the upsampling is set to, for example, 0.

The learning filter 503 performs filtering on the difference e. The learning filter 503 is, for example, a multi-rate filter for the difference e upsampled by the upsampler 502. Hereinafter, the learning filter 503 may be referred to as H(z). H(z) may be a multi-rate phase delay filter that approximates an inverse characteristic of the closed-loop characteristic of the feedback control system 200b. The closed-loop characteristic of the feedback control system 200b represents, for example, a characteristic of a change in the difference e with respect to a given MA advanced amount command value $r_m$.

Figure 7:
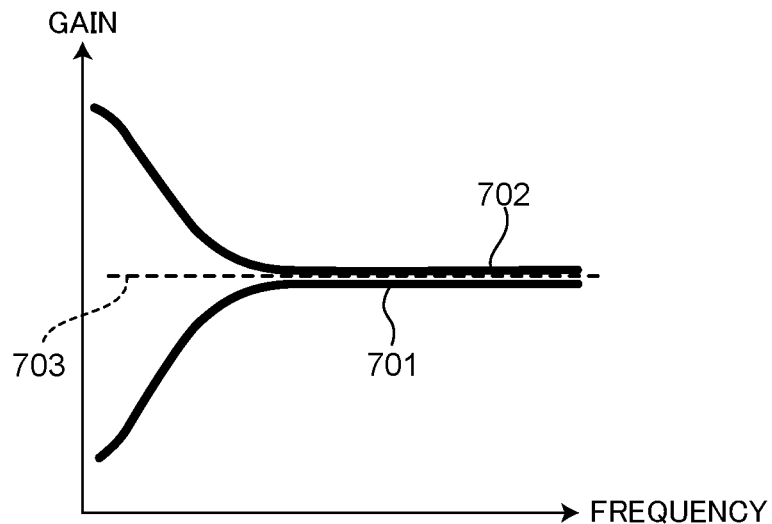
FIG. 7 is a diagram schematically illustrating frequency characteristics.

FIG. 7 is a diagram schematically illustrating a relationship between a closed-loop characteristic of the feedback control system 200b and a frequency characteristic of H(z). The characteristic 701 indicates a closed-loop characteristic of the feedback control system 200b. As illustrated in FIG. 7, the characteristic 701 indicates a characteristic that the gain gradually increases from a small gain in a low frequency region and is a constant gain at a high frequency. In order to cancel the small gain in the low frequency domain of the closed-loop characteristic and increase the gain, the characteristic 702 indicating the frequency characteristic of H(z) is determined so as to approximate the inverse characteristic of the closed-loop characteristic of the feedback control system 200b.

The characteristic 703 indicates a frequency characteristic of the control system combining both the characteristic 701 of the feedback control system 200b and the characteristic 702 of the iterative learning controller 500. The characteristic 703 has a constant gain in a wider frequency domain. As a result, convergence characteristics of the learning control are improved.

Returning to FIG. 6, the low-pass filter 504 receives the learning data stored in the memory 501 to output the signal from which the high frequency component has been removed to the adder 507. As illustrated in FIG. 6, the low-pass filter 504 may be represented as Q(z). In the sample time corresponding to the index i of the j-th seek control, the value (the value stored in the (j−1)-th seek control) of the learning data at the position indicated by the index (i+1) is input to the low-pass filter 504. Since a phase delay occurs by one sample time in the low-pass filter, the zero-phase low-pass characteristic is realized by using a value of a later time by one sample time.

The adder 507 adds the output of the low-pass filter 504 and the output of the learning filter 503, and stores the addition result at a position indicated by a corresponding index in the memory 501 as learning data to be used in the next (j+1)-th seek control.

In parallel with the processing by the low-pass filter 504 and the adder 507, the average value calculation unit 505 calculates an average value of the values of the plurality of pieces of learning data stored in the memory 501.

The adder/subtractor 508 subtracts the average value calculated by the average value calculation unit 505 from the value of the learning data to input a result of the subtraction to the integrator 506. When the index of the memory 501 in which the output of the adder 507 is stored is i (at the cycle time corresponding to the index i of the j-th seek control), a value (value stored in the (j−1)-th seek control) at the position indicated by the index (i+d) corresponding to the later time by d are input to the adder/subtractor 508. The reason for using the value at the later time by d indexes is to enhance the stability of the learning control.

The integrator 506 calculates the integral of the output of the adder/subtractor 508 to output the calculation result to the MA 14 as the MA advanced amount command value $r_m$. For example, the integrator 506 outputs, as an integral value, a value obtained by adding the output of the adder/subtractor 508 every time the index increases from the value corresponding to the index 0.

The integrator 506 corresponds to an integrator configured to integrate values based on a plurality of pieces of learning data stored in the memory 501 to output the MA advanced amount command value $r_m$. More specifically, the integrator 506 integrates a value obtained by subtracting the average value calculated by the iterative learning in the j-th seek control from one of the plurality of pieces of learning data (the value at the position indicated by the index (i+d)) to output the MA advanced amount command value $r_m$ of the (j+1)-th seek control.

The iterative learning control is executed, for example, in each of a plurality of sample times corresponding to the memory length of the memory 501. After completion of the iterative learning control, that is, after the sample time corresponding to the memory length, the MA advanced amount command value $r_m$ is preferably 0. In a case where the final value of the MA advanced amount command value $r_m$ by the iterative learning control is not 0, a transient response is likely to occur, which causes disturbance to head positioning.

Therefore, in the present embodiment, the adder/subtractor 508 outputs a signal obtained by subtracting the average value from the value of the learning data to the integrator 506, and the integrator 506 outputs a value obtained by integrating the signal as the MA advanced amount command value $r_m$. As a result, the final value of the MA advanced amount command value $r_m$ is always 0, and the transient response as described above can be prevented.

Figure 8:
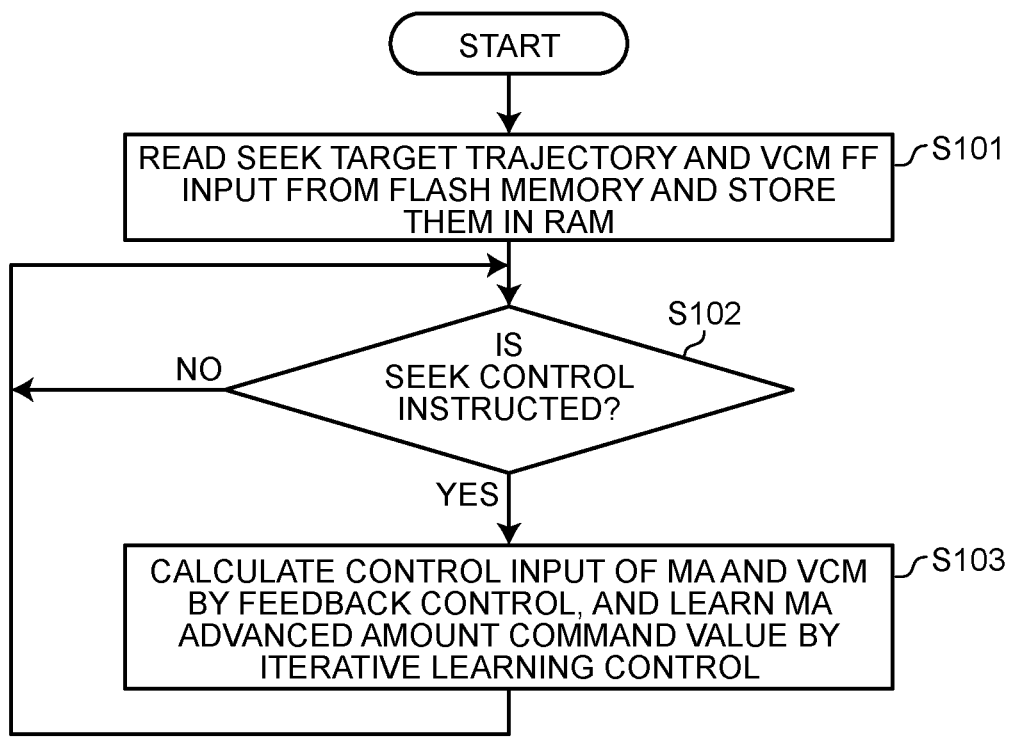
FIG. 8 is a flowchart of a seek control process.

Next, the seek control process by the HDD 10 will be described. FIG. 8 is a flowchart illustrating an example of a seek control process according to the embodiment.

For example, when the HDD 10 is activated, the seek control unit 100b reads the seek target trajectory 301 and the VCM FF input 303 from the flash memory 184 and stores them in the RAM 187 (step S101).

The seek control unit 100b determines whether seek control has been instructed, for example, based on a command from the host 20 (step S102). When the seek control is not instructed (step S102: No), the process is iterated until the instruction is given.

When the seek control is instructed (step S102: Yes), the seek control unit 100b calculates the control inputs $u_m$ and $u_v$ of the MA 14 and the VCM 15 by the feedback control, and learns the MA advanced amount command value $r_m$ by the iterative learning control (step S103). Thereafter, the process returns to step S102 for the next seek control, and the process is iterated.

Figure 9:
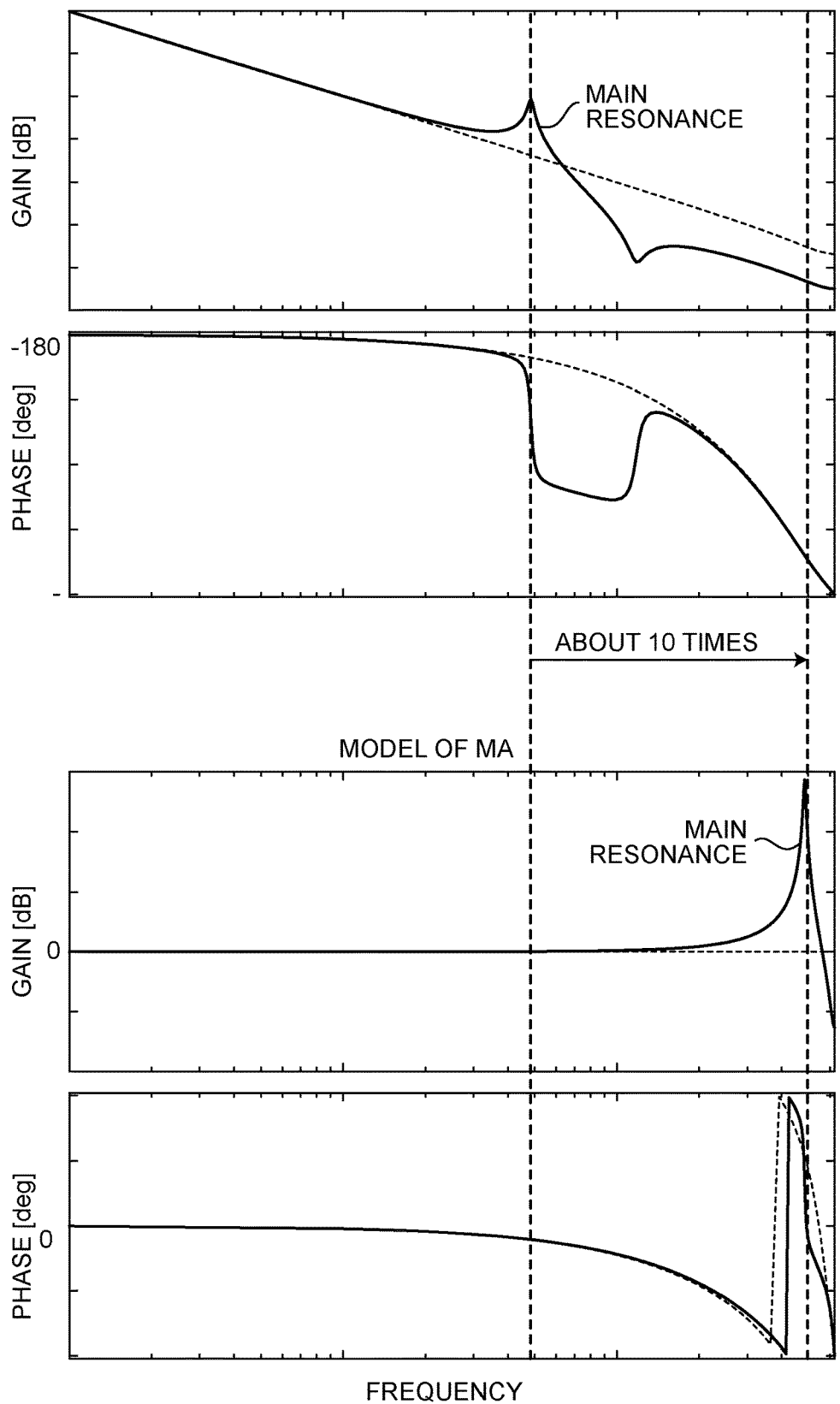
FIG. 9 is a diagram illustrating an example of a frequency response of a model that simulates a transmission characteristic of an actuator.

Next, a simulation result of the seek control according to the present embodiment will be described. FIG. 9 is a diagram illustrating an example of a frequency response of a model simulating transmission characteristics of the MA 14 and the VCM 15. Generally, in a magnetic disk device including a dual-stage actuator, the mechanical main resonance mode of the MA 14 is designed to have a high frequency band about 10 times the mechanical main resonance mode of the VCM 15. The model illustrated in FIG. 9 represents a model designed by a similar method.

Figure 10:
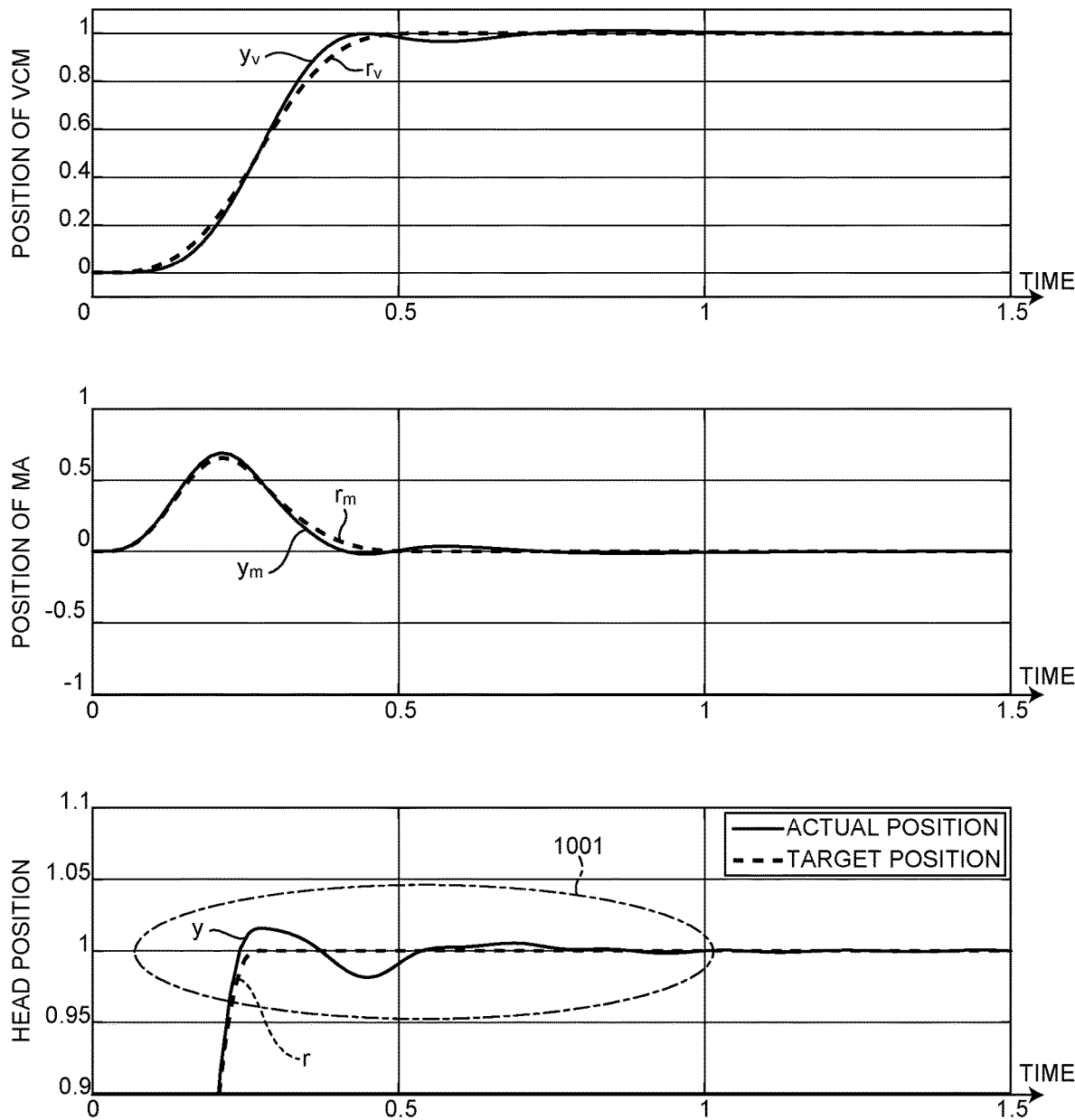
FIG. 10 is a diagram illustrating an example of a simulation result of an adjacent track seek.
Figure 11:
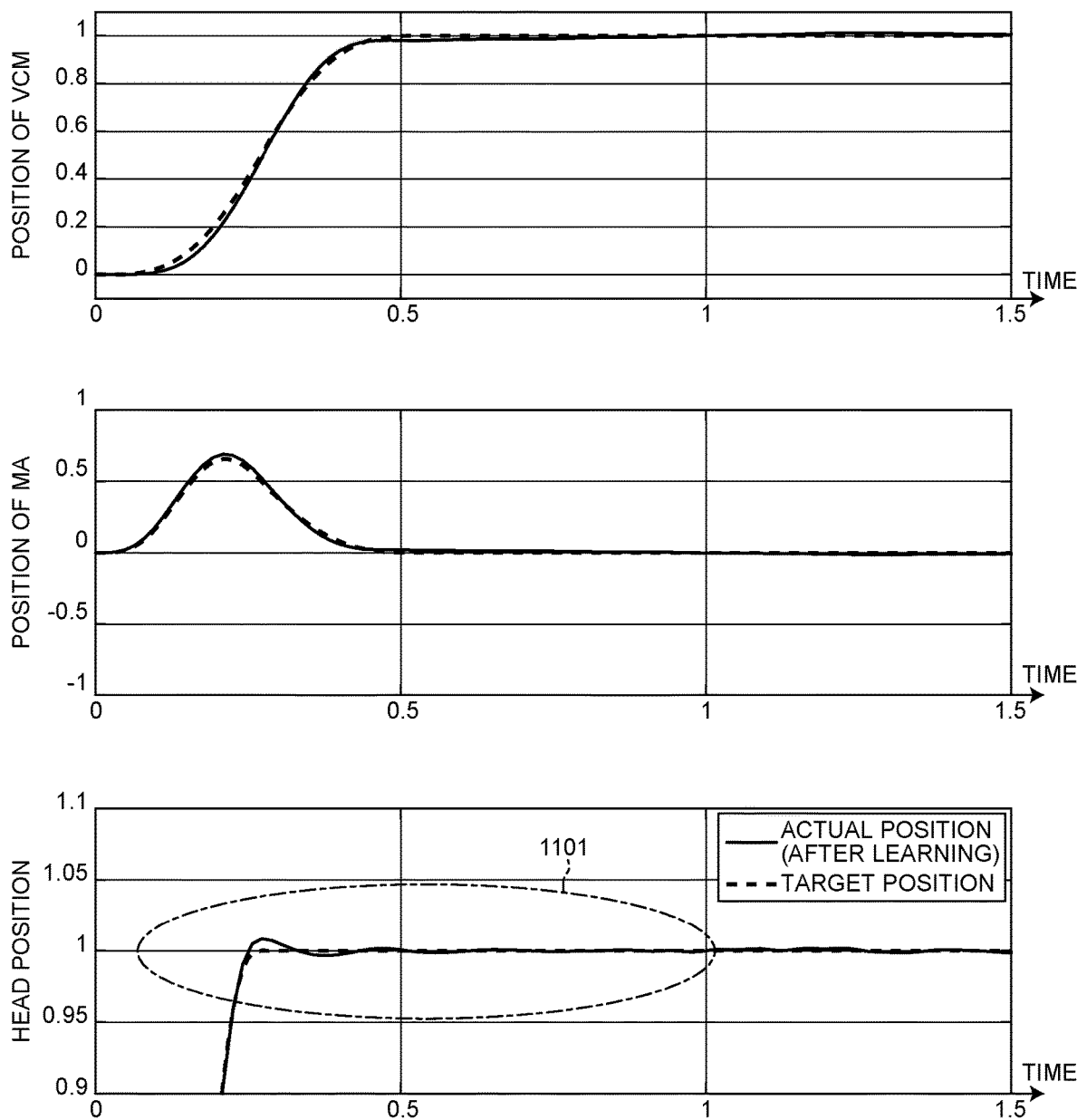
FIG. 11 is a diagram illustrating an example of a simulation result of an adjacent track seek.

FIG. 10 is a diagram illustrating an example of a result of simulating the adjacent track seek using the model of FIG. 9 and the seek control according to Expression (1) as illustrated in FIG. 2. FIG. 11 is a diagram illustrating an example of a result of simulating the adjacent track seek using the model of FIG. 9 and the seek control of the present embodiment (FIG. 5). FIGS. 10 and 11 illustrate the time response (upper graph) of the position of the VCM 15, the time response (center graph) of the position of the MA 14, and the time response (lower graph) of the head position that is the sum of the amounts of movement of the two during the seek control. The horizontal axis represents time.

As illustrated in a region 1001 of FIG. 10, in the $r_m$ generation method illustrated in Expression (1), for example, a deviation occurs between the target trajectory and the actual position due to the influence of mechanical resonance included in the MA 14 and the VCM 15, and vibration occurs in the seek settling.

On the other hand, as illustrated in a region 1101 of FIG. 11, in the present embodiment in which $r_m$ is generated by the iterative learning control, it can be seen that the vibration at the time of the seek settling can be suppressed by the effect of the iterative learning.

As described above, in the present embodiment, the second-stage or third-stage actuator (MA or the like) goes toward the target track in advance prior to the operation of the first-stage actuator (VCM or the like), thereby achieving a high-speed adjacent track seek. At this time, the control input of the MA is updated for each seek by the iterative learning control. This improves the seek settling. That is, according to the present embodiment, it is possible to realize high speed seek control and high accuracy settling.

Each unit illustrated in FIG. 5 is realized by, for example, one or a plurality of processors. For example, each of the above units may be realized by causing a processor such as the CPU 186 to execute a program, that is, by software. Each of the above units may be realized by a processor such as a dedicated integrated circuit (IC), that is, hardware. Each of the above units may be realized by using software and hardware in combination. In a case where a plurality of processors is used, each processor may implement one of the units or two or more of the units.

The program executed by the magnetic disk device of the embodiment is provided by being incorporated in the program ROM 185 or the like in advance.

The program executed by the magnetic disk device according to the embodiment may be provided as a computer program product by being recorded as a file in an installable format or an executable format in a computer-readable recording medium such as a compact disk read only memory (CD-ROM), a flexible disk (FD), a compact disk recordable (CD-R), or a digital versatile disk (DVD).

In addition, the program executed by the magnetic disk device according to the embodiment may be stored on a computer connected to a network such as the Internet and provided by being downloaded via the network. In addition, the program executed by the magnetic disk device according to the embodiment may be provided or distributed via a network such as the Internet.

The program executed by the magnetic disk device according to the embodiment can cause the computer to function as each unit of the magnetic disk device described above. In this computer, the CPU 186 can read a program from a computer-readable storage medium onto a main storage device and execute the program.

While a certain embodiment has been described, this embodiment has been presented by way of example only, and are not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   an arm;
   a support member provided at a distal end of the arm;
   a magnetic head provided on the support member and configured to access the magnetic disk;
   a first actuator configured to rotate the arm;
   a second actuator configured to drive the support member; and
   one or more processors configured to implement a controller configured to perform seek control of the magnetic head, wherein
   the controller includes:
      a feedback controller configured to control a first command value for driving the first actuator such that an error between a position of the magnetic head and a target position is reduced; and
      an iterative learning controller configured to receive an input value based on the error and output a second command value for driving the second actuator by iterative learning, and
   the iterative learning controller includes:
      a learning filter that is a filter for the input value that has been input, and is a multi-rate phase delay filter configured to approximate an inverse characteristic of a closed-loop characteristic of the feedback controller,
      a memory configured to store therein a plurality of pieces of learning data output from the learning filter in a plurality of sampling times of the seek control, and
      an integrator configured to integrate values based on the plurality of pieces of learning data stored in the memory, to output the second command value.

2. The device according to claim 1, wherein the support member is one or both of a slider and a suspension.

3. The device according to claim 1, wherein the iterative learning controller includes an average value calculator configured to calculate an average value of the plurality of pieces of learning data, and wherein the integrator is configured to integrate a value obtained by subtracting the average value calculated by the iterative learning in the j-th seek control from one of the plurality of pieces of learning data, to output the second command value of the (j+1)-th seek control, where j is an integer of 1 or more.

4. A magnetic disk device comprising:
   a magnetic disk;
   an arm;
   a support member provided at a distal end of the arm;
   a magnetic head provided on the support member and configured to access the magnetic disk;
   a first actuator configured to rotate the arm;
   a second actuator configured to drive the support member; and
   one or more processors configured to implement a controller configured to perform seek control of the magnetic head, wherein
   the controller includes:
      a feedback controller configured to control a first command value for driving the first actuator such that an error between a position of the magnetic head and a target position is reduced; and
      an iterative learning controller configured to receive an input value based on the error and output a second command value for driving the second actuator by iterative learning,
   the feedback controller includes
      an observer configured to estimate a position of the magnetic head as a state, and output an estimated value of the position of the magnetic head, and
   the input value is a difference between a subtraction value and the estimated value, the subtraction value being obtained by subtracting a value corresponding to an amount of movement of the second actuator from the error.

5. The device according to claim 4, wherein the support member is one or both of a slider and a suspension.

6. A control method executed by a magnetic disk device, the magnetic disk device including:
   a magnetic disk;
   an arm;
   a support member provided at a distal end of the arm;
   a magnetic head provided on the support member and configured to access the magnetic disk;
   a first actuator configured to rotate the arm;
   a second actuator configured to drive the support member; and
   a controller configured to perform seek control of the magnetic head,
   the method comprising:
   by the controller,
      controlling a first command value for driving the first actuator such that an error between a position of the magnetic head and a target position is reduced; and
      receiving an input value based on the error and outputting a second command value for driving the second actuator by iterative learning, wherein the iterative learning includes:
         storing, in a memory, a plurality of pieces of learning data output from a learning filter in a plurality of sampling times of the seek control, the learning filter being a filter for the input value that has been input, and is a multi-rate phase delay filter configured to approximate an inverse characteristic of a closed-loop characteristic of the controller, and integrating values based on the plurality of pieces of learning data stored in the memory, to output the second command value.

* * * * *